Patented May 13, 1924.

1,494,068

UNITED STATES PATENT OFFICE.

EMANUEL KLEIN, OF NEW YORK, N. Y.

FATLESS SOAP OR NONFATTY DETERGENT PRODUCTS AND SYSTEM OF PRODUCING SAME.

No Drawing. Application filed April 28, 1920. Serial No. 377,257.

*To all whom it may concern:*

Be it known that I, EMANUEL KLEIN, a citizen of the United States, and a resident of the borough of Manhattan, city, county, and State of New York, have invented a new and useful Fatless Soap or Nonfatty Detergent Products and System of Producing Same, of which the following is a specification.

It is well known that animal or vegetable fats, etc., have been heretofore chiefly used as raw material for the manufacture of soap by the well known saponification process, i. e., by decomposing any ester by means of an alkali, producing that mixture of alkali salts of fatty acids and water which is known in commerce under the name of soap, a mixture of sodium or potassium salts of fatty acid.

It must be pointed out here that there is continual gradation possible between purely mechanical processes, the physical phenomena of adhesion, adsorption, and solid solution, and finally the process of chemical combination.

A physical phenomenon is the formation of so-called "adsorption" compounds. This phenomenon has recently led to a colloid compound. A large number of substances, and the fibres as corncob, meal, etc., themselves belong to the class of colloids. Many of these substances will dissolve in water, forming what are termed colloidal solutions, i. e., solutions in which the dissolved particles are of much larger order of magnitude than those of ordinary solutions, so that they will not diffuse through parchment and may usually be made visible by means of the ultramicroscope. These dissolved particles have been proved to bear electric charges, those of a basic nature acquiring a positive, those of an acid or neutral nature usually taking up a negative charge. It has also been shown, that all the fibres become negatively charged in contact with pure water, whereas in contact with acids they usually assume a positive charge. Now, if a colloidal solution containing positively charged particles is added to one in which negatively charged particles are present these mutually attract each other and combine, to form what are called adsorption compounds. The latter are precipitated from solution, the electrical charges being neutralized at the same time. A colloid compound is produced by the phenomenon of "adsorption" between a colloid bearing a positive and a colloid bearing a negative electric charge when in solution. It may also be stated, that colloids, true colloidal clay, earth, minerals, etc., are used as an adjunct in the manufacture of my new fatless soap, and substances formerly classed as insoluble bodies in water, may be prepared in such a fine state of division as to enable them to be so dispersed in water that they produce colloidal solutions. In this connection it may be stated that in colloidal solutions, which do not pass through membranes on dialysis, or colloidal crystalloids, which do make their way through such septa readily, the adsorption phenomena in particular play a very great part, and are an important property of colloidal bodies, and therefore colloids are not to be looked upon as a "filling" material nor as an adulterant but as an actual substitute for soap material, inasmuch as that when dissolved in water, then considerably lowers the surface tension of the water against air, and are therefore greatly absorbed by other bodies, and hence also have the power of raising the viscosity of water, and have great emulsifying action on other bodies. Colloids closely resemble soap in their physical behavior. For instance, to a suspension of colloidal clay in water add a certain amount of alkali, in which case the clay disperses through the water and forms a colloidal solution, producing a more or less viscous liquid depending upon the amount of clay dispersed. In the case of a colloidal solution, containing 40% of colloidal clay the liquid has the consistency of thick cream. Add to a colloidal solution of clay, or earth, or shells, an amount of caustic in excess of the maximum required to produce colloidal dispersion, and the clay, etc., coagulates or swells and settles out.

Physically the solutions of soap and colloids resemble each other closely, viz, their surface tensions are lower than that of water, their viscosities are greater, they both possess emulsifying power, both have the power of absorbing dirt, grease, etc., to a marked extent, and both have detergent properties. Chemically, colloid and soap belong to two distinct types of compounds, soap being a sodium salt of a fatty acid, whilst colloidal clay is an aluminum salt of silicic acid, or hydrated aluminum silicate.

My invention involves the production of non-fatty soap or fatless chemical product having properties like saponified fat and includes the system of producing same, which consists essentially in combining saponaceous earth; and colloidal clay in conjunction with complex organic acids $C_{44}H_{64}O_5$. It may further consist in addition of soap root, tree, berry, bark and leaves, *radix Sapindus;* glucoside from *Saponaria officinalis* $C_{32}H_{54}O_{18}$ in union with caustic, and the siliceous remains of minute organisms called diatoms, as infusorial earth, kieselguhr, mined in Nevada and California, combined by chemical action of hydrolization whereby the matter is formed into a non-fatty soap or fatless product having properties like saponified fat. The preponderantly complex organic substances consist essentially of acids $C_{44}H_{64}O_5$, exemplified by abietic acid; and the complex organic mass of quillaic acid $C_{19}H_{30}O_{10}$; *Quillaja sapotoxin* $C_{17}H_{26}O_{10}$ which infusion foams like soap water, and must therefore be considered a legitimate substitute for fatty matter, inasmuch as the alkali salts of the complex organic acids exhibit valuable detergent properties.

One object of my present invention is to produce a substitute for the saponified fatty soap heretofore used, consisting essentially of non-fatty ingredients, or of a fatless product having properties like saponified fat to be chiefly used for its cleansing power, since it contains a large acid radical, which loosens the greasy matter, forming therewith an emulsion upon shaking which a persistent lather is obtained which may be readily washed away.

Another object of this invention is to produce a fatless product having properties like saponified fat for the use of persons forbidden by religious tenets to use a commonly saponified fatty soap, such product representing a substitute thereof, consisting of non-fatty acid radicals and saponaceous earth, colloidal clay, etc., which exhibit valuable detergent properties, and the infusion of which foams like soap water, forming therewith an emulsion which then may be washed away.

Another object of this invention is to produce a non-fatty acid radical having properties like saponified fat by chemical action, i. e., decomposing any complex organic non-fatty ingredient by means of an alkali, and saponaceous or colloidal matter in union with siliceous diatoms, thus forming a compound of alkali salts of non-fatty acid and an aqueous menstruum, under the name of fatless soap,—said product being cheaper, and requiring less labor and less time in production.

In enabling my invention to be fully understood the following exemplification will afford an illustration of the practical system of producing same.

*Ingredients.*—All in a natural comminuted raw state—

About 50 lbs. fibres, meal, as corn cob.
About 200 lbs. saponaceous earth, as African clay.
About 50 lbs. $C_{19}H_{30}O_{10}$ of quillaic acid.
About 10 lbs. $C_{17}H_{26}O_{10}$ of sapotoxin.
About 500 lbs. $C_{44}H_{64}O_5$ of organic complex rosin.
About 200 lbs. colloidal clay.
About 100 lbs. alkali hydroxides, as NaOh, Koh.
About 200 lbs. diatoms, as infusorial earth, kieselguhr.

These are incorporated together and fed into an open receiving and mixing cylinder until a complete intermixture is obtained. The disintegrated material is diluted with about 210 gallons of an aqueous menstruum and is thoroughly agitated, then admixed by means of compressed hot air (not excessively, for excessive aeration would result in the mixture containing numerous large and weak air bubbles which would collapse immediately before or upon use) and then subjected to the action of steam at about 80 to 85° C., or probably higher whereby the ingredients are heated and cooked, till the mass combines physically, and chemically by the action of vapor, and with the contacting hydrolyzing agent in presence of compressed hot air, till on shaking no permanent lather is produced, so as to promote the rapid evaporation of excess of water, thus forming a semi-dry hydrolyzed colloidal fatless chemical soap having properties like saponified fat.

The new invented non-fatty product is identified by the distinct positive reaction. Dilute 5 grams of fatless soap with water and add a solution of copper sulphate in slight excess. If the soap is fatless and constituted of non-fatty acid it will be shown by the formation of resinate of copper, green in color and soluble in oil of turpentine. If the sample is treated with a 10% solution of borax, the resin is then dissolved and the non-fatty acid left. With the foregoing and other objects in view the semi-dry non-fatty soap having properties like saponified fat is perfumed (when required) with benzoin resinate or with any desired non-volatile flavor or etherial oils, and medicaments (in the case of medicated fatless soap) in the proportion needed and incorporated with the mass in the last stage of the process and churned with the compressed air, not excessively for reasons above stated. The prepared fatless soap while still warm in semi-dry form is run into soap crutching machines, wherein coloring, etc. (if desired) are incorporated, and thence run into soap frames in which the warm semi-dry mass is allowed to cool.

The soap in the frames requires a few days to solidify. The sides of the soap frames are then removed, and thus a rectangular soap block is left. This block is cut first into slabs of the required thickness either by hand or in a slabbing machine and finally cut to the desired size and weight of the familiar soap cake.

Although alkalies are useful, increasing the lathering and detergent properties of soap, they are extremely unpleasant to the human skin and very deleterious and harmful to textiles. Colloids on the other hand, being perfectly neutral substances, are not only harmless to the skin and textiles, but are actually beneficial to the skin. Owing to the highly adsorptive properties of colloids the presence of alkali in the fatless colloid products with which it is admixed is permissible since this will mostly be absorbed by the saponaceous earth, clay, etc., and therefore, rendered harmless.

While the material is converted into a semi-dry saponified non-fatty mass the same is only necessary to be stirred by the prepared heated air current at about 30 to 35° C., for about one hour to be substantially prepared suitable for grinding under edge-runners. The ground matter is then reduced to a powder in a disintegrater, thus being adapted for use for detergent and cleansing purposes, in pulverized form.

My invention is not limited to the precise steps and exemplified raw ingredients herein set forth, as it is manifest that I produce fatless soap or non-fatty products having properties like saponified fat, comprising colloids, etc., and characteristic alkali salts of a non-fatty acid radical identified by the herein specified reaction with a solution of copper sulphate in slight excess. The so defined properties render my fatless soap and non-fatty products available for many commercial uses, in finely powdered or solid state, and in fact as substitutes for the fatty saponified soap heretofore chiefly used in detergents.

What I claim as my invention and desire to secure by Letters Patent is,

1. A non-fatty product or fatless soap comprising varieties of colloidal fibres, saponaceous earth, colloidal clay, guillaic acid, complex rosin, sapotoxin, alkali hydroxides, having cleansing properties, an infusion thereof foaming like soap water, forming therewith an emulsion, indicated by reaction with a solution of copper sulphate in slight excess, giving a green precipitate of copper resinate, as set forth.

2. A non-fatty compound or fatless soap comprising corn-cob fibres, saponaceous African clay, diatoms, and alkali salt of non-fatty abietic acid, having cleansing detergent properties forming an emulsion, indicated by reaction with a solution of copper sulphate in slight excess, giving a precipitate of green copper resinate, as set forth.

3. A fatless soap or non-fatty chemical product comprising saponaceous African earth, rosin, colloidal clay, alkali hydroxides of sodium, potassium, and kieselguhr, having all the physical and chemical characteristics of fatless soap or non-fatty detergent properties and indicated by reaction with a solution of copper sulphate in slight excess, giving a precipitate of green copper resinate, as set forth.

4. A fatless soap or non-fatty product consisting substantially of hydrated aluminum silicate, fibres, meal, corn-cob, soap roots, soap bark, soap berry, soap leaves of *Saponaria officinalis*, alkali hydroxides, and resin, having all the physical and chemical characteristics of fatless soap and identified by the property of reaction with a solution of copper sulphate in slight excess, giving a precipitate green copper resinate, as set forth.

5. A fatless soap or non-fatty detergent product, comprising hydrated aluminum silicate, abietic acid guillaia, sapotoxin, alkali hydroxides, and infusorial earth, having properties like saponified fat containing a large acid radical which loosens the greasy matter, forming therewith an emulsion indicated by reaction with a solution of copper sulphate in slight excess giving green copper resinate, as set forth.

6. A fatless soap or non-fatty compound, comprising non-fatty acid radicals, saponaceous earth, colloidal clay, resin, alkali hydroxides, which exhibit detergent properties forming an emulsion and indicated by reaction with a solution of copper sulphate in slight excess, giving a precipitate of green resinate as set forth.

7. A fatless soap or non-fatty product, comprising saponaceous African earth, colloidal clay, abietic acid, sodium hydroxide and potassium hydroxide, having cleansing properties, an infusion thereof foaming like soap water, forming therewith an emulsion and indicated by reaction with a solution of copper sulphate in slight excess giving a green copper resinate as set forth.

8. The method of producing a fatless soap or a non-fatty detergent chemical product, which consists in comminuting fatless colloidal ingredients in combination with fibres, meal, corncob, alkali hydroxides, in an open receiving and mixing cylinder until a complete intermixture is obtained, subjecting the intermixture to the action of an aqueous menstruum to effect a preliminary colloidal solution, agitating the ingredients named by means of compressed hot air and contact of steam at a temperature of about 80° to 85° C., to effect a preliminary colloidal suspension, and heating and cooking the admixture with a hydrolyzing agent to produce colloidal dispersion, then promoting a rapid evaporation and excess of the aqueous menstruum by action of compressed hot air to produce the fatless soap or non-fatty detergent product, as set forth.

9. The method of manufacturing a non-fatty, cleansing composition, consisting substantially in subjecting colloids and alkali hydroxides containing substantially fatless material of an aqueous menstruum, to a temperature of over 80° to 85° C., to effect a preliminary colloidal dispersion, then promoting a rapid evaporation and excess of the aqueous menstruum by action of compressed hot air, and then converting the semi-dry fatless or non-fatty mass by action of a heated compressed air current at about a temperature of 30° to 35° C., to produce a powder or solid non-fatty detergent product or fatless soap as set forth.

EMANUEL KLEIN.

Witnesses:
 GEO. WM. MIATT,
 DOROTHY MIATT.